United States Patent

[11] 3,577,986

| [72] | Inventor | Leslie K. Regent |
| | | Nice, France |
| [21] | Appl. No. | 790,754 |
| [22] | Filed | Jan. 13, 1969 |
| [45] | Patented | May 11, 1971 |
| [73] | Assignee | Surgical Developments Limited |
| | | Hersham, Walton-on-Thames, Surrey, England |

[54] HERNIAL SUPPORT DEVICE
8 Claims, 5 Drawing Figs.

[52] U.S. Cl. ................................... 128/96, 128/107
[51] Int. Cl. ................................... A61f 5/28
[50] Field of Search ............................ 128/95, 96, 98, 99, 100—120

[56] References Cited
UNITED STATES PATENTS

| 3,021,838 | 2/1962 | Fine | 128/100 |
| 3,236,233 | 2/1966 | Thompson | 128/107 |
| 3,393,674 | 7/1968 | Nelkin | 128/96 |

Primary Examiner—Adele M. Eager
Assistant Examiner—G. F. Dunne
Attorney—Holcombe, Wetherill & Brisebois ABSTRACT: A hernial support device consists of an abdominal belt from which one or two understraps are suspended by touch-and-close fasteners. Pads of foamed rubber are adjustably built up of laminar elements of flat and domed shapes by touch-and-close elements and attached to the understraps by touch-and-close fasteners so that pad thickness and position is adjustable without changing pressure or resilience.

PATENTED MAY 11 1971   3,577,986
Fig.1   Fig.2
Fig.3
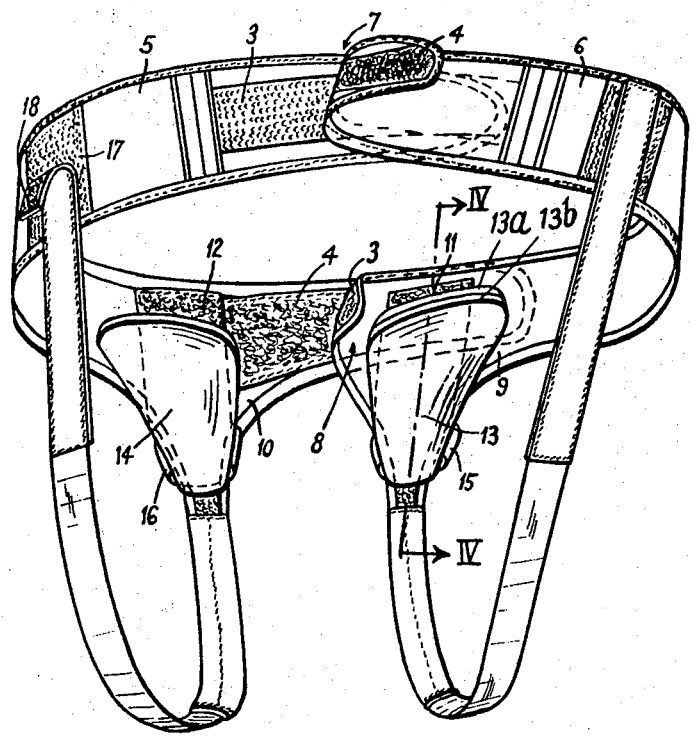
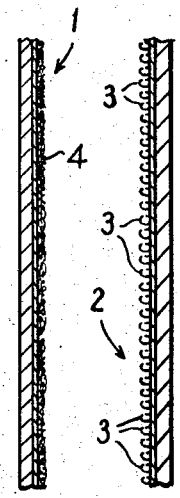
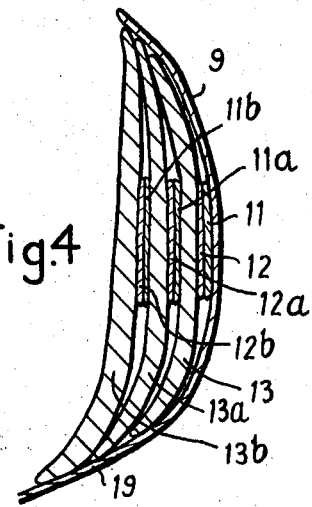
Fig.4
Fig.5
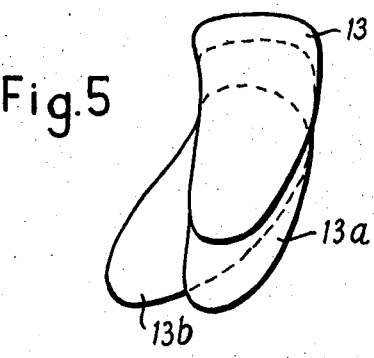
Inventor
Leslie K. Regent
By
Attorney

HERNIAL SUPPORT DEVICE

The present invention relates to an improved hernial support device.

Hernial support devices normally comprise a waist-encircling belt to which are attached, by buckles or the like, one or more sling straps, supporting one or more pressure pads. Whilst such devices have been made in a range of sizes and/or with means for fixing the pads in any one of several fixed positions, the considerable variation between one patient and another of body size and shape, coupled with the variations in site and number of the hernia, have made it generally impossible up to the present to provide an appliance precisely adapted to the needs of any one patient. Of course, a specially dimensioned appliance could be made for a particular patient but this is expensive.

In applicant's British Pat. No. 981,538 there is described an improved appliance wherein the pad or each of them, where more than one is provided, is engaged on the appliance by means of a touch-and-close fastener, whereby the pad or pads may be adjustably positioned in any one of a number of different directions. By the term "touch-and-close fastener" is meant a fastener comprising interengageable surfaces, one of which surfaces comprises a large number of substantially rigid regularly orientated hooklike elements and the other of which surfaces comprises a mat or pad presenting randomly orientated fibers or staples which are interengageable with said hooklike elements when the surfaces are pressed together. This fastener is marketed in the United States under the trade mark Velcro. However it is frequently necessary or at least desirable to provide also means of adjusting the thickness of each pad in particular cases and even as the patient's body measurements change in the course of time. Whilst the aforesaid patent discloses that the pad may comprise a filling material contained in a pocket or an inflatable air sac, adjustments by such means are subject to the drawbacks of being awkward to effect and slow leakage of the inflated air sac. Moreover thickness adjustment cannot be effected by the latter means without simultaneously altering the pressure of the air sac and hence its resilience.

It is an object of the present invention to overcome these drawbacks.

Another object is to provide an improved hernial support in which pad thickness adjustments may be effected without simultaneously altering its pressure and resilience.

Yet another object is to provide an improved rupture appliance in which the thickness of the pads and their positions on the holding parts of the appliance can be easily adjusted.

Other features and advantages of the invention will emerge from the description which follows in which several embodiments of a hernial support according to the invention are explained in detail purely by way of illustrative examples and with reference to the accompanying drawings, in which:

FIGS. 1 and 2 respectively show sections through touch-and-close fastener material for said interengageable surfaces;

FIG. 3 shows a perspective view of an appliance according to the invention;

FIG. 4 shows a view of a cross section along the line IV-IV of FIG. 3; and

FIG. 5 shows a modified arrangement of the pads 13, 13a, 13b of FIGS. 3 and 4.

Referring to the drawings, FIGS. 1 and 2 respectively show the two parts of a touch-and-close fastener, which comprises two interengaging surfaces 1 and 2, one applied to a first part and the other to a second part to be engaged together, one of said surfaces e.g. 2 comprising a large number of substantially rigid regularly oriented hooklike elements 3 generally made from a synthetic organic plastic material such as a polyamide and the other of said surfaces e.g. 1 comprising a mat or pad 4 presenting randomly oriented fibers or staples of the same or a similar material to the hooks 3 but being of very much smaller cross section and quite pliable. When the two surfaces are pressed together the fibers 4 of the surface 1 embed themselves in the hooks 3 of the other surface 2 and are tightly gripped thereby, whereby the surfaces and the two parts to which they are attached are securely held together, so securely in fact that they must be physically torn apart. This tearing apart, however, causes no damage and the fasteners have a long life.

In putting the invention into effect, the waist-encircling belt shown in FIG. 3 comprises two parts 5 and 6 held in adjusted position by surfaces 3 and 4 of touch-and-close material of the kind shown in FIGS. 1 and 2 at the places 7 and 8. A portion of adjacent understraps 9 and 10 connected thereto, depending upon the area in which it is required that a pad shall be positioned, is provided with sewn-on surfaces containing for example the randomly oriented fibers at 11, 11a and pad elements 13, 13a are provided with a piece of material 12, 12a containing the surface that comprises the hook elements. One of the surfaces e.g. the surface 11, may be made substantially larger than the other 12, whereby it will be apparent that the pad elements may be adjusted in any of a number of positions and directions simply by touching the two interengageable surfaces together, and sufficient overlap of the two surfaces is provided for this purpose. If desired, each pad may be of elongated shape and provided with a loop 15, 16 at one end passing around the associated understrap 9 or 10 whereby one end of the pad may be used as a pivot about which the pad can be turned for positioning and securing by mutual contact of the two interengaging surfaces. If desired, the pad and the belt or strap may each have more than one of the prepared surfaces.

Advantageously, the other ends of the understraps also may be similarly engaged to the belt by the touch-and-close surfaces, as shown at 17, 18.

It will be apparent that the invention allows completely different pads to be used with a single belt so that different shapes of pad or different sizes thereof may be built up in the required position as the occasion demands.

In the arrangement shown in FIG. 4, the elements 13 and 13a and 13b are superimposed to provide maximum thickness over most of the central area of the pad and symmetrically.

In the arrangement shown in FIG. 5, the elements are staggered both linearly and angularly to provide maximum thickness over a common central overlap area but diminishing unsymmetrically towards the ends of the pad.

The pad elements may be flat or domed shapes and of a variety of thicknesses, textures and resiliences and advantageously such as can be made of moulded foamed elastomers by known techniques.

Other elements of softer or stiffer nature may be included in the pad if desired to supplement its properties e.g. a pad of kapok or foamed rubber or plastic contained in a pocket having a flap closable by means of a touch-and-close fastener, or an inflatable sac contained in a similar pocket whereby different pressures can be caused to bear on the desired site according to the degree of inflation.

It will be apparent that various changes and modifications may be made in the embodiments described without departing from the essential concept of the invention as defined in scope by the appended claims. For instance, the belt may be of pull-on type or a scrotal sac may also be attached to the belt by touch-and-close means.

I claim:

1. In a hernial support device comprising an abdominal belt, at least one understrap attached to said belt and at least one pad detachably secured to said understrap by touch-and-close fastener means, the improvement which consists in that said pad comprises a plurality of elements with touch-and-close fastener means between adjacent ones of said elements whereby any desired thickness of pad can be established by adding and subtracting desired numbers of said elements.

2. A device according to claim 1, in which said pad is of elongated shape and provided with a loop at one end passing around its associated understrap.

3. A device according to claim 1, in which at least one element in said pad is of flat shape.

4. A device according to claim 1, in which at least one element in said pad is of domed shape.

5. A device according to claim 1, in which at least one element in said pad is foamed elastomer.

6. A device according to claim 1, in which at least one of said elements comprises a filling material contained in a pocket having a flap closable by a touch-and-close fastener.

7. A device according to claim 1, in which at least one of said elements is of domed shape and of a foamed elastomer.

8. A device according to claim 7, in which at least one element of flat shape is included between said domed element and said understrap.